United States Patent
Yen et al.

(10) Patent No.: US 7,180,835 B2
(45) Date of Patent: Feb. 20, 2007

(54) DATA ACCESS METHOD FOR IMPROVING PERFORMANCE OF AN OPTICAL DISK DRIVE

(75) Inventors: Meng-Shin Yen, Taipei (TW); Tso-Tsai Chen, Taipei (TW)

(73) Assignee: BenQ Corporation, Tao-Yuan Hsien (TW)

( * ) Notice: Subject to any disclaimer, the term of this patent is extended or adjusted under 35 U.S.C. 154(b) by 685 days.

(21) Appl. No.: 10/707,223

(22) Filed: Nov. 28, 2003

(65) Prior Publication Data

US 2004/0148440 A1    Jul. 29, 2004

(30) Foreign Application Priority Data

Nov. 29, 2002    (TW) ............................... 91134686 A

(51) Int. Cl.
*G11B 7/00*      (2006.01)
(52) U.S. Cl. ............................... 369/44.28; 369/44.34; 369/47.1; 369/53.28
(58) Field of Classification Search ..................... None
See application file for complete search history.

(56) References Cited

U.S. PATENT DOCUMENTS 6,408,285 B1 *   6/2002   Oshima et al. ................ 705/57
6,693,861 B1 *   2/2004   Lim ........................ 369/44.28
6,785,204 B1 *   8/2004   Okuyama et al. ........ 369/44.32

* cited by examiner

*Primary Examiner*—Muhammad Edun
(74) *Attorney, Agent, or Firm*—Winston Hsu

(57) ABSTRACT

A data access method for improving performance of an optical disk drive is applied on a predetermined data access operation. A predetermined application program and the optical disk drive are used to run first, second, and third processes for accomplishing the predetermined data access operation. The predetermined application program runs the first process, and the optical disk drive runs the second process. The data access method includes the predetermined application program running the first process and outputting a control command to command the optical disk drive to start the second process, and the predetermined application program running the third process for controlling the optical disk drive to access an optical disk after the first process and the second process are finished. In addition, the time for the predetermined application program to complete the first process overlaps the time for the optical disk drive to complete the second process.

14 Claims, 5 Drawing Sheets

DATA ACCESS METHOD FOR IMPROVING PERFORMANCE OF AN OPTICAL DISK DRIVE

BACKGROUND OF INVENTION

1. Field of the Invention

The present invention relates to a data access method for an optical disk drive. In particular, the present invention discloses a data access method for improving performance of an optical disk drive.

2. Description of the Prior Art

Computers are popular for use in a broad spectrum of fields. Aside from commercialapplications, the computers have entered family settings to provide users with multimedia entertainment. Because the multimedia entertainment requires a great demand for video data and audio data to generate amazing effects, data storage technology is accordingly developed to record a huge amount of video data and audio data. In order to let users easily store digital data, many kinds of storage devices are invented one after another. For example, an optical disk has low production cost, small size, and great capacity. The optical disk, therefore, has become a practical tool for storing data recently. For commercialapplications, the optical disks such as program installation disks, and video compact disks (VCDs) are widely used to be storage media for carrying software and multimedia data by users.

With regard to companies or individual persons, storage or management of documents is an important task. In the past, most documents were printed or written on papers. Therefore, if a total amount of documents is great, it is difficult for users to keep the documents owing to great volume or heavy weight of the documents. Nowadays, a compact disk recorder is invented to solve the above-mentioned inconvenience. The compact disk recorder fully utilizes advantages such as low production cost, small size, and great capacity of the optical disk, and burns digital data into the optical disk so that users are capable of keeping desired data. Please refer to FIG. 1, which is a block diagram of a prior art computer device 10. The computer device 10 has a central processing unit (CPU) 12, a north bridge circuit 14, a south bridge circuit 16, a memory 18, an optical disk drive 20, an input device 21, a video graphics array (VGA) card 22, and a monitor 24. The CPU 12 is used to control operation of the computer device 10. The north bridge circuit 14 is used to control data transmission between the CPU 12 and high-speed peripheral devices such as the memory 18 and the VGA card 22. On the contrary, the south bridge circuit 16 is used to control data transmission between the CPU 12 and low-speed peripheral devices such as the optical disk drive 20 and the input device 21. The memory 18 is used to store an application program 25 so that the CPU 12 is capable of accessing the memory 18 for executing the application program 25. The optical disk drive 20 has a pick-up head 26 used to access an optical disk 26 for reading data or writing data. The input device 21 is used to receive character signals from a keyboard and pointing signals from a mouse inputted by a user. When the user wants to use the optical disk drive 20 (a CD-R drive for example) to store digital data into the optical disk 28, the user has to start a corresponding application program 25 within the computer device 10(a writing program for example). In other words, the writing program controls operation of the CD-R drive for burning data onto the optical disk 28. Please refer to FIG. 2, which is a flow chart showing a data writing process of the optical disk drive 20 shown in FIG. 1. The operation includes following steps:

Step 100: Execute the application program 25;

Step 102: Detect hardware characteristic parameters of the optical disk drive 20;

Step 104: Set information about user data that are going to be written into the optical disk 28;

Step 106: The application program 25 starts a writing procedure; Step 108: The application program 25 prepares the user data;

Step 110: The optical disk drive 20 performs an optimum power control;

Step 112: The application program 25 guides the optical disk drive 20 to record the user data on the optical disk 28.

The above-mentioned process is briefly explained as follows. The user uses the input device 21 to input keyboard character signals or mouse pointing signals for starting the application program 25 (the writing program). The CPU 12 then executes the application program 25 loaded into the memory 18, and controls a user interface (UI) corresponding to the application program 25 displayed on the monitor 24 through the VGA card 22 (step 100). The application program 25 outputs a query command to the optical disk drive 20 (The CD-R drive) for querying the optical disk drive 20 about its hardware characteristic parameters such as writing speeds supported by the optical disk drive 20. After that, the optical disk drive 20 reports the hardware characteristic parameters back to the application program 25 (step 102). Therefore, the user can set a desired writing speed for the optical disk drive 20 through the application program 25. The optical disk drive 20 then records data according to the writing speed set by the user. At the same time, the user sets information related to the wanted data through the application program 25. For example, the user determines which files are going to be recorded on the optical disk 28 (step 104). After the user completes required setting for a writing procedure through the UI corresponding to the application program 25, the user can start the writing procedure via the application program 25 (step 106). After the writing procedure is activated, the application program 25 starts gathering user data from a data source according to the setting set by the user. For instance, the application program 25 searches files containing the user data in a hard-disk drive (step 108). Then, the application program 25 outputs a control command to drive the optical disk drive 20 to begin an optimum power control for acquiring a laser power used to burn the gathered user data onto the optical disk 28 (step 110). Finally, the application program 25 drives the optical disk drive 20 to write the user data onto the optical disk 28 according to the setting previously set by the user.

As mentioned above, before the optical disk drive 20 writes data onto the optical disk 28, the optical disk drive 20 has to start the optimum power control for searching an appropriate writing power for the optical disk 28. With regard to the optimum power control, the well-known Orange Book specification has detailed description on it. Operation of the optimum power control is briefly described as follows. After the optimum power control begins, the pick-up head 26 of the optical disk drive 20 first reads an indicative optimum writing power P from a leadin area of the optical disk 28. The indicative optimum writing power P is a suggested writing power recommended by the manufacturer of the optical disk 28. After that, the pick-up head 26 uses seven writing powers P1~P7 that are less than the indicative optimum writing power P, the indicative optimum writing power P, and seven writing powers P8~P14 that are greater than the indicative optimum writing power P (15 test powers in total) to perform writing tests on 15 successive blocks of a test area on the optical disk 28. The pick-up head 26 detects the test results in the 15 blocks. Each of the detected signals is an AC coupled HF signal. For the detected signals, the Orange Book specification defines a parameter β. If the parameter β of one detected signal conforms to the desired requirement, the test power related to the detected signal can be used as the optimum writing power for the optical disk 28. In addition, if the parameters β of the 15 test powers do not meet the desired requirement, the 15 test powers are not suitable for the optical disk 28. Therefore, other test powers are picked to perform the writing tests until the optimum writing power is obtained. It is obvious that the optimum power control is a "trial and error" process. In other words, it takes a period of time to find out the optimum writing power. During the step 106 which starts the writing procedure and the step 112 which records user data on the optical disk 28, the application program 25 has to prepare the desired user data and to perform the optimum power control. While the step 108 is operating, the optical disk drive 20 is idle without receiving the power control command used to trigger the optimum power control. That is, the prior art recording control corresponds to a sequential mode. The optical disk drive 20, therefore, will enter an idle mode during the writing procedure so that the performance of the optical disk drive is deteriorated.

In addition, when the user wants to use the optical disk drive 20 to read data recorded on the optical disk 28, for example, the user wants to play video and audio data recorded on the optical disk 28 on the monitor 24, the user needs to start a corresponding application program 25 such as a multimedia player. That is, the multimedia player is used to control operation of the optical disk drive 20 for reading video and audio data recorded on the optical disk 28, and the multimedia player also display the video data on the monitor 24. Please refer to FIG. 3, which is a flow chart showing a data reading process of the optical disk drive 20 shown in FIG. 1. The operation includes following steps:

Step 200: Execute the application program 25;

Step 202: Detect characteristic parameters of the optical disk 28;

Step 204: Set information about user data that are going to be retrieved;

Step 206: The application program 25 starts a reading procedure; Step 208: The application program 25 loads related plug-ins;

Step 210: The optical disk drive 20 searches the user data on the optical disk 28;

Step 212: The optical disk drive 20 retrieves the user data on the optical disk 28, and transmits the retrieved user data to the application program 25.

The above operation is described as follows. The user inputs keyboard character signals or mouse pointing signals through the input device 21 for starting the application program 25 (the multimedia player). The CPU 12 executes the application program loaded in the memory 18, and controls the VGA card 22 to show a user interface corresponding to the application program 25 on the monitor 24 (step 200). Then, the application program 25 outputs a query command to the optical disk drive 20 for driving the optical disk drive 20 to read characteristic parameters of the optical disk 28 such as a table of content (TOC), and format of the recorded data on the optical disk 28, etc. The optical disk drive 20 then reports the characteristic parameters of the optical disk 28 back to the application program 25 (step 202). The user, therefore, is capable of setting information about the wanted user data according to the TOC within the characteristic parameters. For example, the user can select a video filename with the help of the TOC. At the same time, the user also set many control parameters related to playback of the user data through UI of the application program 25. For instance, the user decides which plug-ins that should be loaded to provide fantastic effects or special functions (step 204). After the user completes setting the reading procedure parameters through UI of the application program 25, the user can start the reading procedure via the application program 25 (step 206). When the reading procedure is activated, the application program 25 first starts plug-ins according to the control parameters set by the user (step 208). Then, the application program 25 outputs a control command to control the optical disk drive 20 for searching location of the wanted user data on the optical disk 28 (step 210). Finally, the application program 25 drives the optical disk drive 20 to retrieve the wanted data on the optical disk 28 according to the previously set control parameters, and the application program 25 will process the retrieved data and outputs the processed data. As mentioned above, while step 208 is operating, the optical disk drive 20 cannot receive control commands from the application program 25 to begin searching the location of the user data on the optical disk 28. In other words, the optical disk drive 20 is idle during step 208. It is obvious that the prior art reading control corresponds to a sequential mode. The optical disk drive 20, therefore, will enter an idle mode during the reading procedure so that the performance of the optical disk drive 20 is deteriorated.

SUMMARY OF INVENTION

It is therefore a primary objective of the claimed invention to provide a method for improving data access performance of an optical disk drive.

Briefly summarized, the preferred embodiment of the claimed invention discloses a method of accessing data through an optical disk drive. The optical disk is connected to a computer host, and the computer host has a central processing unit (CPU) for controlling operation of the computer host and a storage device for storing a predetermined program. The CPU executes the predetermined program for driving the optical disk drive to complete a predetermined access operation through a first procedure, a second procedure, and a third procedure. The first procedure is performed by the predetermined program, and the second procedure is performed by the optical disk drive. The method includes the predetermined program performing the first procedure and outputting a control command to the optical disk drive for actuating the optical disk drive to perform the second procedure, and the predetermined program performing the third procedure for controlling the optical disk drive to access an optical disk after the first procedure and the second procedure are completed. In addition, a period when the predetermined program performs the first procedure overlaps a period when the optical disk drive performs the second procedure.

It is an advantage of the claimed invention that the claimed data access method adopts a parallel processing model to execute two predetermined processes at the same period. Therefore, the processing time is greatly shortened. In addition, the claimed data access method only alters sequence of executive steps for improving data access performance of the optical disk drive without any modifications imposed on the hardware of the optical disk drive. Therefore, the claimed data access method is easily implemented with low cost.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
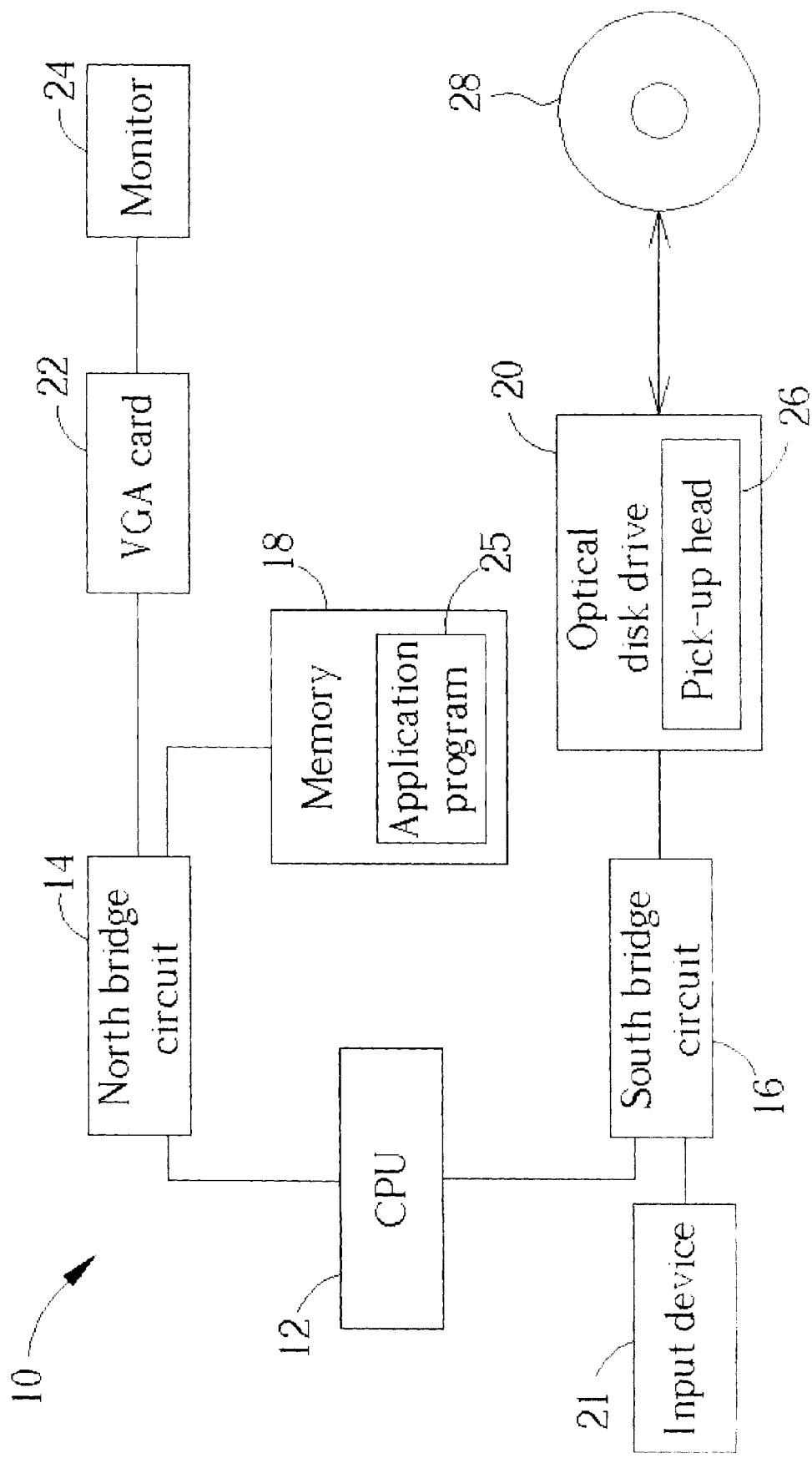
FIG. 1 is a block diagram of a prior art computer device.
Figure 2:
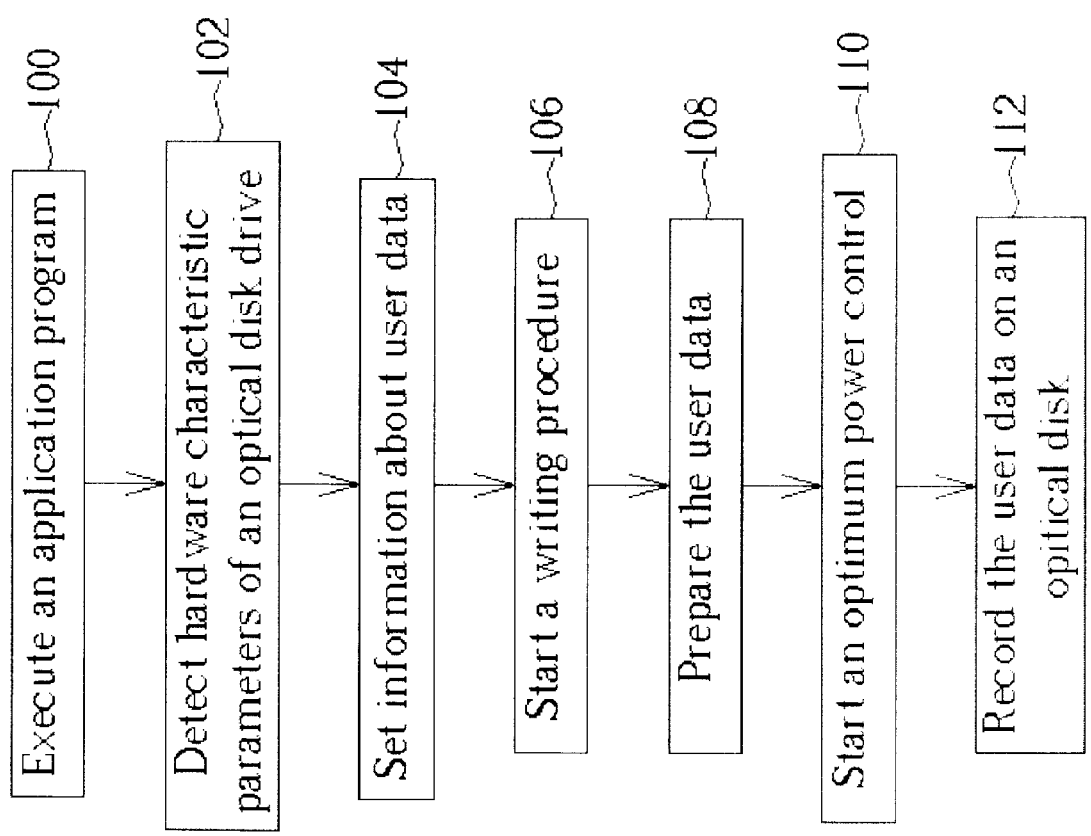
FIG. 2 is a flow chart showing a data writing process of the optical disk drive shown in FIG. 1.
Figure 3:
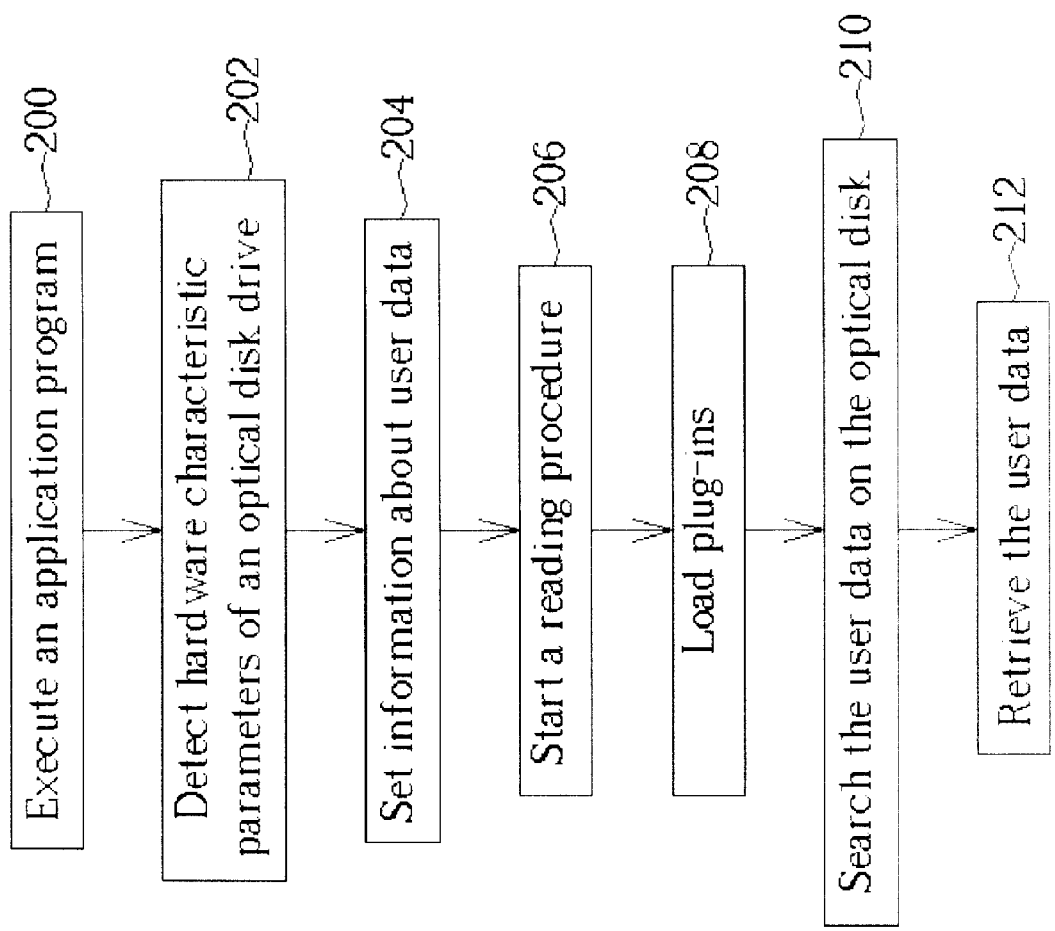
FIG. 3 is a flow chart showing a data reading process of the optical disk drive shown in FIG. 1.
Figure 4:
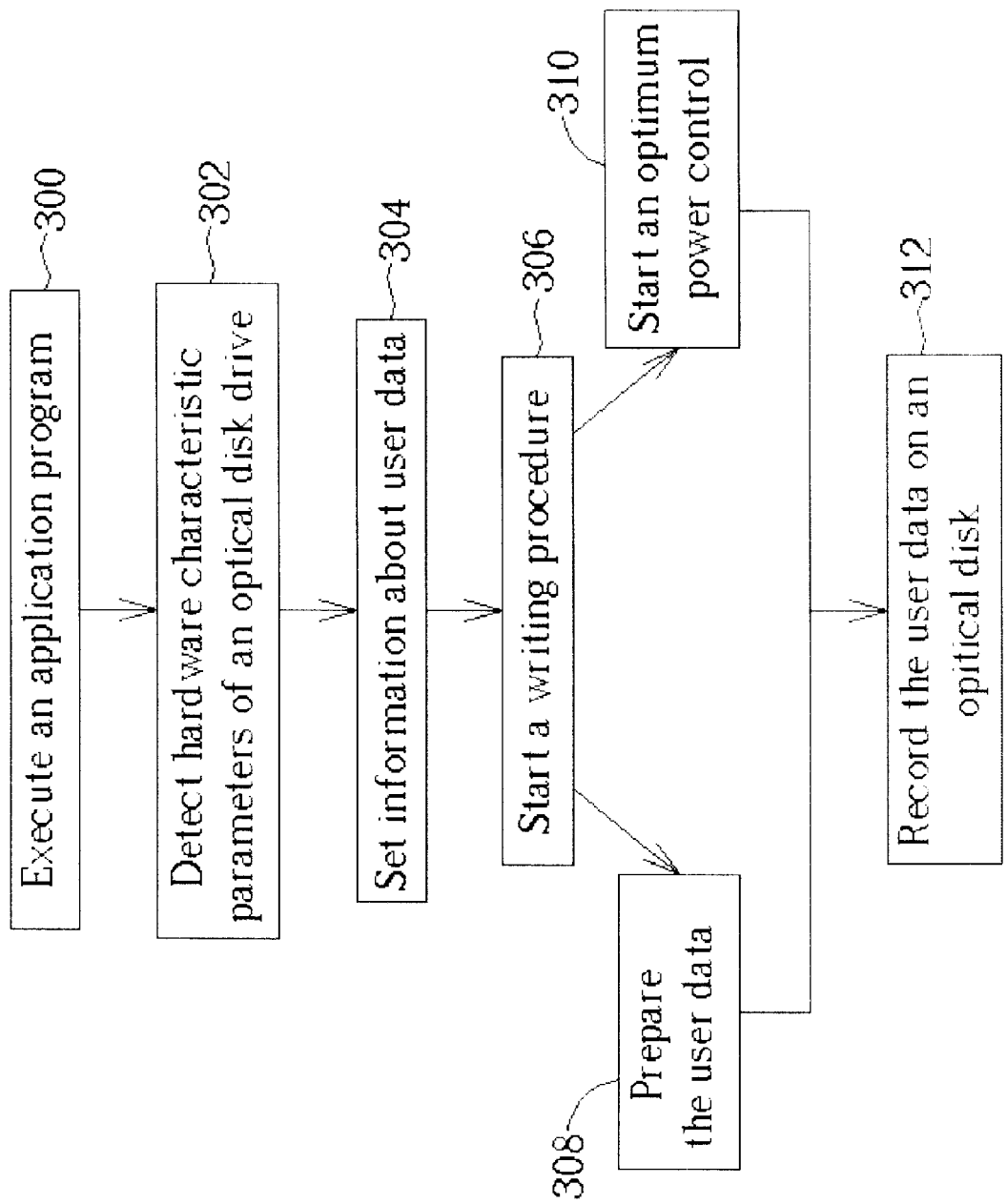
FIG. 4 is a flow chart showing a data writing process of the data access method according to the present invention.

Please refer to FIG. 4 in conjunction with FIG. 1. FIG. 4 is a flow chart showing a data writing process of the data access method according to the present invention. The data access method according to the present invention is applied on the computer device 10 shown in FIG. 1. Therefore, operation of the computer device 10 is not repeatedly explained. As mentioned before, when the user wants to use the optical disk drive 20 (a CD-R drive for example) to store digital data into the optical disk 28, the user has to start a corresponding application program 25 within the computer device 10 (a writing program for example). In other words, the writing program controls operation of the CD-R drive for burning data onto the optical disk 28. The operation for storing data on the optical disk 28 according to the present invention includes following steps:

Step 300: Execute the application program 25;

Step 302: Detect hardware characteristic parameters of the optical disk drive 20;

Step 304: Set information about user data that are going to be written into the optical disk 28;

Step 306: The application program 25 starts a writing procedure, and then activates step 308 and step 310 simultaneously;

Step 308: The application program 25 prepares the user data. Jump to step 312;

Step 310: The optical disk drive 20 performs an optimum power control (OPC). Jump to step 312;

Step 312: The application program 25 guides the optical disk drive 20 to record the user data on the optical disk 28.

The above-mentioned process is explained as follows. The user uses the input device 21 to input keyboard character signals or mouse pointing signals for starting the application program 25 (the writing program). The CPU 12 then executes the application program 25 loaded into the memory 18, and controls a user interface (UI) corresponding to the application program 25 displayed on the monitor 24 through the VGA card 22 (step 300). The application program 25 outputs a query command to the optical disk drive 20 (the CD-R drive) for querying the optical disk drive 20 about its hardware characteristic parameters such as writing speeds supported by the optical disk drive 20. After that, the optical disk drive 20 reports the hardware characteristic parameters back to the application program 25 (step 302). Therefore, the user can set a desired writing speed for the optical disk drive 20 through the application program 25. The optical disk drive 20 then records data according to the writing speed set by the user. At the same time, the user sets information related to the wanted data through the application program 25. For example, the user determines which files are going to be recorded on the optical disk 28 (step 304). After the user completes required setting for a writing procedure through the UI corresponding to the application program 25, the user can start the writing procedure via the application program 25 (step 306). For instance, the user uses the input device 21 to generate a mouse pointing signal for triggering a "START" button in a user interface corresponding to the application program 25. In the preferred embodiment, if the writing procedure is activated, step 308 and step 310 begin simultaneously. The application program 25 gathers needed data from a data source according to the information about the user data set by the user, for example, the application program 25 searches a hard-disk drive for the needed data that are going to be written into the optical disk 28 (step 308). On the other hand, the application program 25 outputs a control command to drive the optical disk drive 20 to begin an optimum power control for acquiring a laser power used to burn the gathered user data onto the optical disk 28 (step 310). It is noteworthy that the writing procedure is dominated by the application program 25. Therefore, if the optical disk drive 20 finishes the optimum power control before the data gathering operation run by the application program 25, the optical disk drive 20 will not immediately enter step 312. On the contrary, the optical disk drive 20 has to wait until step 308 and step 310 are completed. The application program 25 then is capable of driving the optical disk drive 20 to run next step 312. That is, the application 25 needs to know status of the optical disk drive 20 to determine whether step 310 is completed. In the preferred embodiment, the application program 25 will output a detecting command to the optical disk drive 20 for commanding the optical disk drive 20 to report a response signal used to inform its status so that the application program 25 is capable of judging whether the optical disk drive 20 has completed step 310 after the application program 25 finishes preparing the user data, the optical disk drive 20 automatically outputs a response signal to inform the application program 25 that step 310 is completed after the optical disk drive 20 finishes step 310, the optical disk drive 20 sets a flag inside an internal memory device after the optical disk drive 20 completes step 310 so that the application program 25 can directly read the flag status to determine whether step 310 is completed, or other diagnosis ways can be used to know current operating status of the optical disk drive 20. In the end, the application program 25 drives the optical disk drive 20 to write the user data onto the optical disk 28 according to the setting previously set by the user.

As mentioned above, during the step 306 which starts the writing procedure and the step 312 which records user data on the optical disk 28, operation of step 308 and step 310 needs to be finished, wherein step 308 is run by the application program 25 and step 310 is run by the optical disk drive 20. Therefore, the present embodiment adopts a parallel processing mode to improve performance of the data recording operation. For example, suppose that the application program 25 needs a period of time $2t$ to prepare the user data, and the optical disk drive 20 needs a period of time $5t$ to finish the optimum power control process. With regard to the prior art recording control, it takes a period of time $(2+5)*t$ for completing both the data preparation and the optimum power control process. However, the preferred embodiment needs only a period of time $5t$ to complete both step 308 and step 310. In addition, if the optical disk drive 20 is a CD-RW drive or a DVD-RW drive, the laser power determined by the optimum power control is an erasing power. The erasing power is used to polish surface of the optical disk 28 so as to erase recorded data. The writing power is then determined by the erasing power. Taking the CD-RW drive for example, the writing power Pw is proportional to the erasing power Pe according to a factor $\epsilon$ (Pw=$\epsilon$*Pe).

Figure 5:
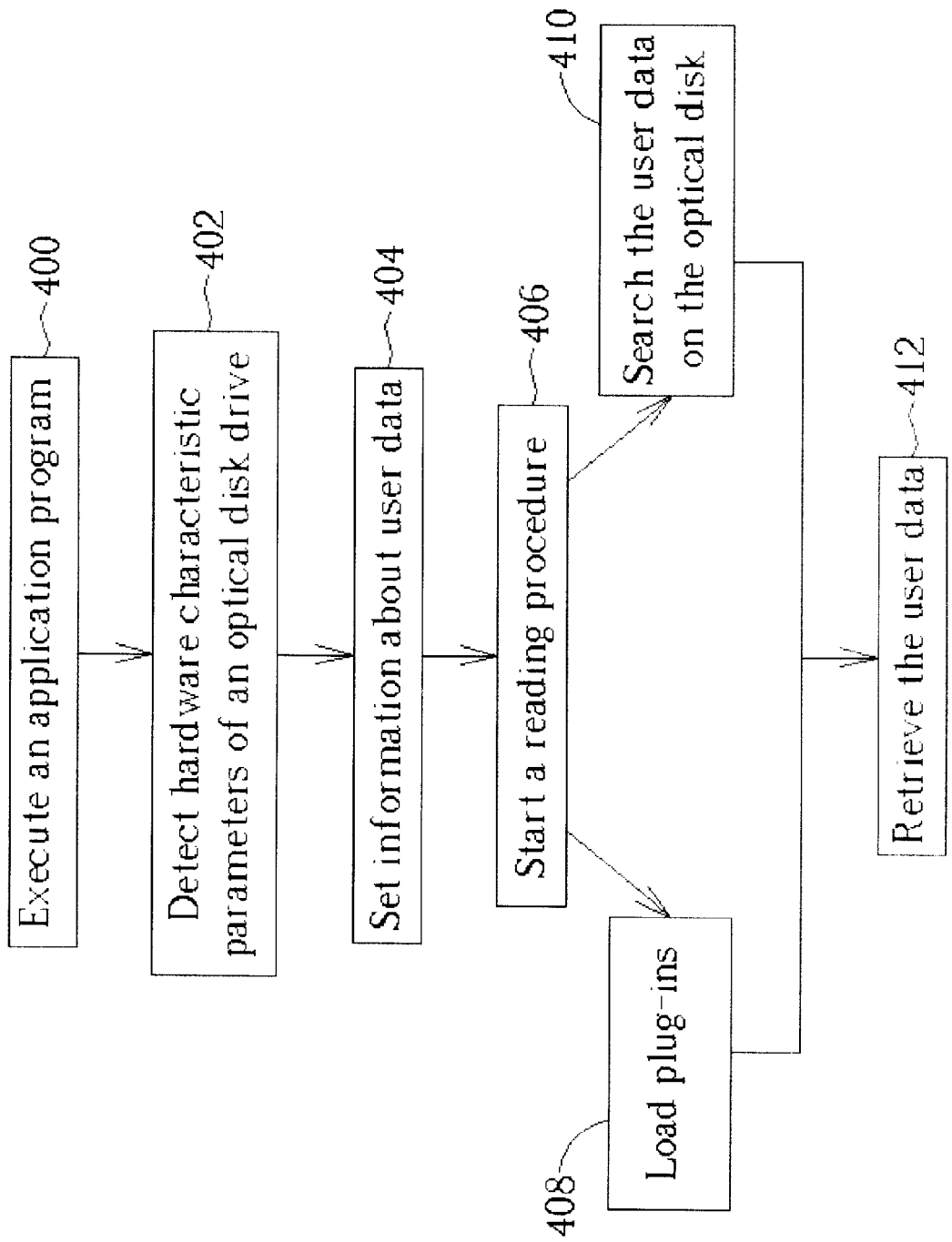
FIG. 5 is a flow chart showing a data reading process of the data access method according to the present invention.

In addition, when the user wants to use the optical disk drive 20 to read data recorded on the optical disk 28, for example, the user wants to play video and audio data recorded on the optical disk 28 on the monitor 24, the user needs to start a corresponding application program 25 such as a multimedia player. That is, the multimedia player is used to control operation of the optical disk drive 20 for reading video and audio data recorded on the optical disk 28, and the multimedia player also display the video data on the monitor 24. Please refer to FIG. 5 in conjunction with FIG. 1. FIG. 5 is a flow chart showing a data reading process of the data access method according to the present invention. The operation includes following steps:

Step 400: Execute the application program 25;

Step 402: Detect characteristic parameters of the optical disk 28;

Step 404: Set information about user data that are going to be retrieved;

Step 406: The application program 25 starts a reading procedure, and then activates step 408 and step 410 simultaneously;

Step 408: The application program 25 loads related plug-ins. Jump to step 412;

Step 410: The optical disk drive 20 searches the user data on the optical disk 28. Jump to step 412;

Step 412: The optical disk drive 20 retrieves the user data on the optical disk 28, and transmits the retrieved user data to the application program 25.

The above operation is described as follows. The user inputs keyboard character signals or mouse pointing signals through the input device 21 for starting the application program 25 (the multimedia player). The CPU 12 executes the application program loaded in the memory 18, and controls the VGA card 22 to show a user interface corresponding to the application program 25 on the monitor 24 (step 400). Then, the application program 25 outputs a query command to the optical disk drive 20 for driving the optical disk drive 20 to read characteristic parameters of the optical disk 28 such as a table of content (TOC), and format of the recorded data on the optical disk 28, etc. The optical disk drive 20 then reports the characteristic parameters of the optical disk 28 back to the application program 25 (step 402). The user, therefore, is capable of setting information about the wanted user data according to the TOC within the characteristic parameters. For example, the user can select a video filename with the help of the TOC. At the same time, the user also set many control parameters related to playback of the user data through UI of the application program 25. For instance, the user decides which plug-ins that should be loaded to provide fantastic effects or special functions (step 404). After the user completes setting parameters of the reading procedure through UI of the application program 25, the user can start the reading procedure via the application program 25. For example, the user uses the input device 21 to input a mouse pointing signal for triggering a "PLAY" button in a user interface corresponding to the application program 25 (step 406).

In the preferred embodiment, if the reading procedure is activated, step 408 and step 410 begin simultaneously. The application program 25 starts wanted plug-ins according to the control parameters set by the user (step 408). On the other hand, the application program 25 outputs a control command to control the optical disk drive 20 for searching location of the wanted user data on the optical disk 28 (step 410). It is noteworthy that the reading procedure is dominated by the application program 25. Therefore, if the optical disk drive 20 finishes step 410 before the application program 25 finishes step 408, the optical disk drive 20 will not immediately enter step 412. On the contrary, the optical disk drive 20 has to wait until step 408 and step 410 are completed. The application program 25 then is capable of driving the optical disk drive 20 to retrieve the user data and transmits the retrieved user data to the application program (step 412). Therefore, the application 25 needs to know status of the optical disk drive 20 to determine whether step 410 is completed. In the preferred embodiment, the application program 25 will output a detecting command to the optical disk drive 20 for commanding the optical disk drive 20 to report a response signal used to inform its status so that the application program 25 is capable of judging whether the optical disk drive 20 has completed step 410 after the application program 25 finishes preparing the user data, the optical disk drive 20 automatically outputs a response signal to inform the application program 25 that step 410 is completed after the optical disk drive 20 finishes step 410, the optical disk drive 20 sets a flag inside an internal memory device after the optical disk drive 20 completes step 410 so that the application program 25 can directly read the flag status to determine whether step 410 is completed, or other diagnosis ways can be used to know current operating status of the optical disk drive 20. In the end, the application program 25 drives the optical disk drive 20 to retrieve the wanted data on the optical disk 28 according to the previously set control parameters, and the application program 25 will process the retrieved data and outputs the processed data for finishing the writing procedure.

As mentioned above, during the step 406 which starts the reading procedure and the step 412 which retrieves user data from the optical disk 28 and transmits user data to the application program 25, operation of step 408 and step 410 needs to be finished, wherein step 408 is run by the application program 25 and step 410 is run by the optical disk drive 20. Therefore, the present embodiment adopts a parallel processing mode to improve performance of the data reading operation. For example, suppose that the application program 25 needs a period of time $2t$ to load the wanted plug-ins, and the optical disk drive 20 needs a period of time $5t$ to finish locating the target track. With regard to the prior art reading control, it takes a period of time $(2+5)*t$ for completing both the plug-in loading operation and the track searching operation. However, the preferred embodiment needs only a period of time $5t$ to complete both step 408 and step 410. In addition, the data access method according to the present invention is capable of being applied to any kind of optical disk drive such as a CD-ROM drive, a CD recorder, or a DVD recorder.

In contrast to the prior art, if a user wants an optical disk drive to perform a certain data access operation, the data access operation includes two predetermined processes respectively run by the optical disk drive and an application program related to the data access operation. The claimed data access method adopts a parallel processing model to execute both predetermined processes at the same period. Therefore, processing time required by a prior art sequential processing model for handling the two predetermined processes is greatly shortened with the help of the claimed data access method. In other words, the claimed data access method only alters sequence of executive steps for improving data access performance of the optical disk drive without any modifications imposed on the hardware of the optical disk drive. To sum up, the claimed data access method is easily implemented with low cost.

The invention claimed is:

1. A method of accessing data through an optical disk drive, the optical disk connected to a computer host, the computer host comprising a central processing unit (CPU) for controlling operation of the computer host, and a storage device for storing a predetermined program, the CPU executing the predetermined program for driving the optical disk drive to complete a predetermined access operation through a first procedure, a second procedure, and a third procedure, the first procedure being performed by the predetermined program, the second procedure being performed by the optical disk drive, the method comprising:

the predetermined program performing the first procedure and outputting a control command to the optical disk drive for actuating the optical disk drive to perform the second procedure; and after the first procedure and the second procedure are completed, the predetermined program performing the third procedure for controlling the optical disk drive to access an optical disk;

wherein a period when the predetermined program performs the first procedure overlaps a period when the optical disk drive performs the second procedure.

2. The method of claim 1 wherein the predetermined access operation is a data writing operation for writing user data into the optical disk.

3. The method of claim 2 wherein the predetermined program is a writing program used for performing the first procedure to prepare the user data predetermined to be written into the optical disk.

4. The method of claim 3 wherein the optical disk drive is a CD-R drive used for performing the second procedure to actuate an optimum power control (OPC) for the optical disk, and the optimum power control determines a laser power required to burn the optical disk for recording the user data.

5. The method of claim 4 wherein the laser power is a write power of the CD-R drive, and when performing the third procedure, the writing program transmits the user data to the optical disk recorder, and the optical disk recorder writes the user data into the optical disk according to the write power.

6. The method of claim 4 wherein the optical disk drive is a CD-RW drive, and the laser power is an erase power of the CD-RW drive.

7. The method of claim 1 wherein before performing the predetermined access operation, the predetermined program outputs a second control command to the optical disk drive for triggering the optical disk drive so that the optical disk drive starts transmitting hardware parameters to the predetermined program.

8. The method of claim 1 wherein when the optical disk drive completes the second procedure, the optical disk drive transmits a response signal to inform the predetermined program that the second procedure has been completed.

9. The method of claim 1 wherein when the optical disk drive completes the first procedure, the optical disk drive transmits a query command to the optical disk drive for detecting whether the optical disk drive has completed the second procedure.

10. The method of claim 1 wherein when the optical disk drive completes the second procedure, the optical disk drive sets a flag parameter so that the predetermined program is capable of reading the flag parameter to determine whether the optical disk drive has completed the second procedure.

11. The method of claim 1 wherein the predetermined program is a data reading operation for reading user data stored on the optical disk.

12. The method of claim 11 wherein the predetermined program is a multimedia player for performing the first procedure to actuate plug-ins while playing the user data.

13. The method of claim 12 wherein the optical disk drive performs the second procedure to search a location of the optical disk used to store the user data.

14. The method of claim 13 wherein when the third procedure is performed, the optical disk drive transmits the user data on the optical disk to the multimedia player, and the multimedia player starts executing the plug-ins while playing the user data.

* * * * *